(12) United States Patent
Callis et al.

(10) Patent No.: US 8,163,219 B2
(45) Date of Patent: Apr. 24, 2012

(54) HELICOPTER BLADE MANDREL

(75) Inventors: Richard A. Callis, Covington, WA (US); Joe White, Dublin, CA (US); Jane White, legal representative, Auburn, WA (US); Scott Newkirk, Kent, WA (US)

(73) Assignee: Hexcel Corporation, Dublin, CA (US)

( * ) Notice: Subject to any disclaimer, the term of this patent is extended or adjusted under 35 U.S.C. 154(b) by 170 days.

(21) Appl. No.: 12/787,439

(22) Filed: May 26, 2010

(65) Prior Publication Data

US 2010/0232973 A1 Sep. 16, 2010

Related U.S. Application Data

(62) Division of application No. 11/645,884, filed on Dec. 27, 2006, now Pat. No. 7,749,421.

(51) Int. Cl.
*B27N 5/02* (2006.01)

(52) U.S. Cl. .......................... 264/257; 264/317; 264/313

(58) Field of Classification Search .................. 264/257, 264/318, 313, 317; 425/438
See application file for complete search history.

(56) References Cited

U.S. PATENT DOCUMENTS

| | | | | | |
|---|---|---|---|---|---|
| 2,503,431 | A | * | 4/1950 | Bender et al. | 269/48.1 |
| 5,248,242 | A | * | 9/1993 | Lallo et al. | 416/226 |
| 5,939,007 | A | * | 8/1999 | Iszczyszyn et al. | 264/258 |

* cited by examiner

*Primary Examiner* — Khanh P Nguyen
*Assistant Examiner* — Vishal I Patel
(74) *Attorney, Agent, or Firm* — W. Mark Bielawski; David J. Oldenkamp

(57) ABSTRACT

Methods and apparatus are provided for making a rotor blade spar from composite material wherein a multi-component mandrel is used to form the composite spar. The mandrel is made using a number of components, which are assembled to provide a structure that is sufficiently strong to maintain the spar shape during pre-cure lay up, compaction and curing of the composite material. The multiple components used to form the mandrel can be separated from each other and easily removed from the spar either before or after curing of the composite material. The mandrel components can then be re-assembled and re-used to form additional composite spars.

16 Claims, 2 Drawing Sheets

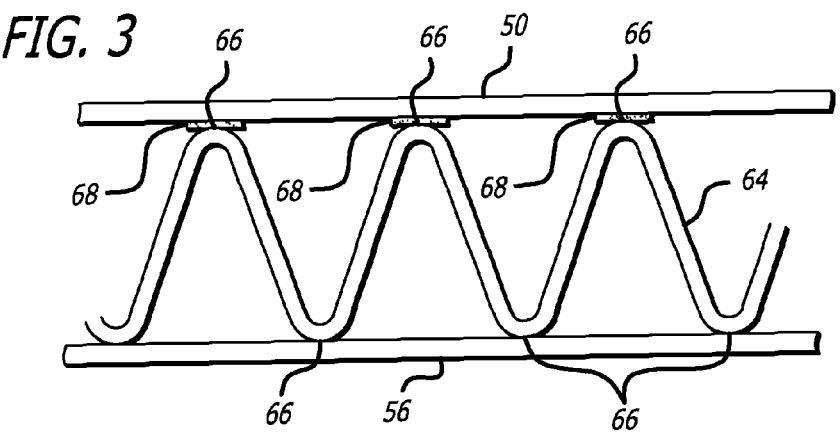
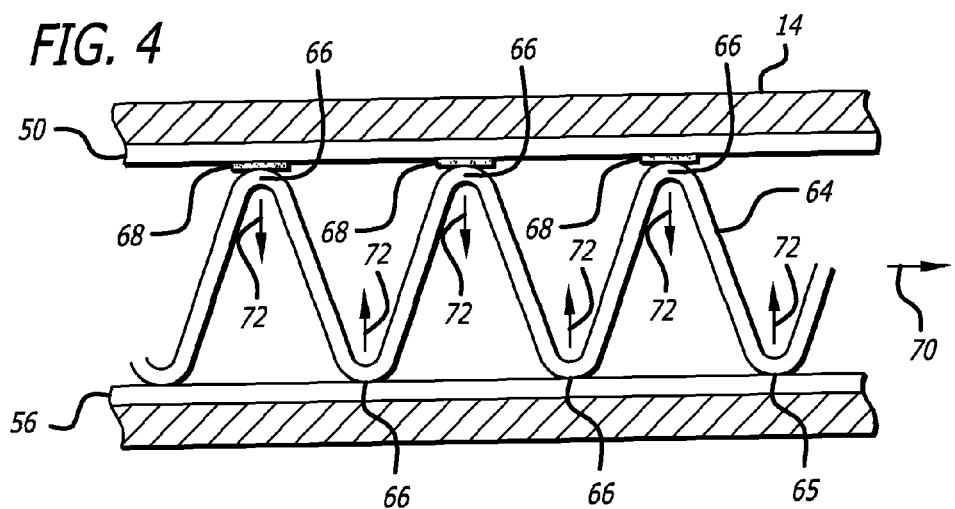
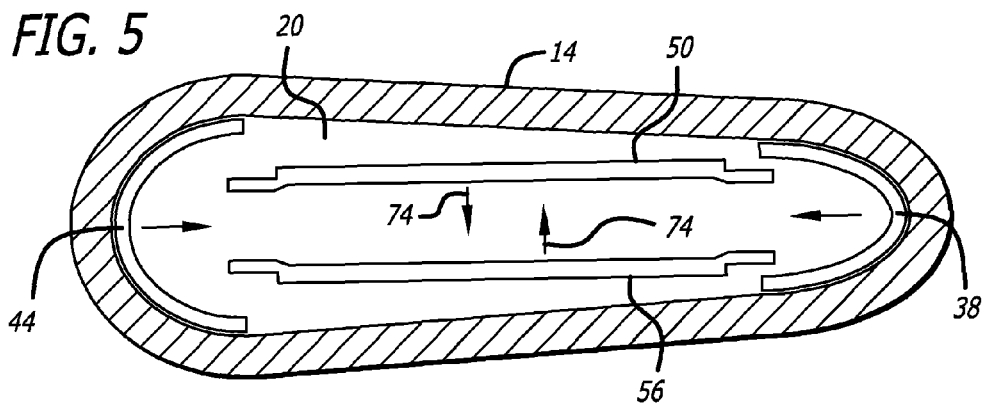

HELICOPTER BLADE MANDREL

This application is a divisional of U.S. patent application Ser. No. 11/645,884 which was filed on Dec. 27, 2006.

BACKGROUND OF THE INVENTION

1. Field of the Invention

The present invention relates generally to helicopter rotor blades that are made from composite materials. More particularly, the present invention is directed to the processes and apparatus that are used in the manufacture of such composite rotor blades.

2. Description of Related Art

Rotor blades are a critical component of every helicopter. The rotor blades are subjected to a complex set of rather extreme aerodynamic forces that vary continually during flight. The rotor blades function as rotating airfoils or wings that are shaped to provide the aerodynamic lift required for a given aircraft. Rotor blades typically include a spar that extends from the root of the rotor blade to its tip. The spar is a major structural element of the rotor blade that provides the blade with the structural strength needed to carry high operational loads.

The typical rotor blade spar is a long tubular structure around which the rest of the blade is formed. The spar tube has an elliptical cross-section that is formed to provide a forward or leading edge and rearward or trailing edge. In order to provide optimum aerodynamic performance, many spar tubes include a slight twist about the longitudinal axis. Typical twists in the spar provide rotations of the elliptical cross-section of up to 10 degrees and more as one moves from the root of the rotor blade to its tip. In addition, the elliptical shape of the spar cross-section may be varied from the spar root to the spar tip to meet a variety of aerodynamic and structural loading parameters.

High strength materials, such as titanium and aluminum alloys, have typically been used to make rotor blades. These high strength metal materials are particularly well suited for forming the rotor blade spar. Titanium has been routinely formed into the relatively long, tubular spar structure and machined or otherwise fabricated to provide a complex variety of twists and varying cross-sectional shapes.

Composite materials have also been used to form rotor blade spars. The combination of light weight and structural strength have made composites a popular choice for making not only the rotor blade spar, but the entire rotor blade. Exemplary composite rotor blades and the processes for making them are described in U.S. Pat. Nos. 4,892,462; 5,346,367; 5,755,558; and 5,939,007.

The typical composite spar is fabricated by applying the uncured composite material to the surface of a long cylindrical mold or mandrel that is shaped to provide the interior surface of the spar tube. After the composite material is applied to the mold or mandrel, it is compacted and cured at an elevated temperature to provide the final spar structure. A problem associated with making composite spars revolves around what to do with the mold or mandrel once the spar has been formed. The length of the mold and the variations in elliptical cross-section of the spar, as well as any twist in the spar, make it very difficult to remove the mold or mandrel after the spar has cured.

One approach to solving the mold/mandrel removal problem has been to make a mold out of a material that is strong enough to maintain its shape during pre-cure fabrication of the composite spar, but which disintegrates or otherwise shrinks during the cure cycle so that it can be removed from the spar cavity or simply left in place. For example, a variety of foams have been used alone or in combination with an underlying hard mandrel structure to provide a suitable spar mold. The foam melts or otherwise shrinks to a fraction of its initial size during curing at elevated temperatures. The resulting shrunken mold is sufficiently small so that it can be removed from the spar cavity or left in place.

Although foam molds have been used successfully in fabricating composite spars for rotor blades, it is many times difficult to find a foam or other material that has the needed structural strength to maintain critical spar dimensions during formation of the spar, while at the same time being able to deteriorate relatively rapidly during cure. In addition, the mold can only be used once, which adds considerably to the cost of spar fabrication.

SUMMARY OF THE INVENTION

In accordance with the present invention, methods and apparatus are provided for making a rotor blade spar from composite material wherein a multi-component mandrel is used to form the composite spar. The mandrel is made using a number of components, which are assembled to provide a structure that is sufficiently strong to maintain the spar shape during pre-cure lay up, compaction and curing of the composite material. The multiple components used to form the mandrel can be separated from each other and easily removed from the spar either before or after curing of the composite material. The mandrel components can then be re-assembled and re-used to form additional composite spars.

As a feature of the present invention, a multi-component mandrel is provided for use in molding a helicopter blade wherein the rotor blade includes a spar that extends parallel to the longitudinal axis of the rotor blade. The spar that is being formed includes interior surfaces that form a spar cavity that also extends longitudinally from the root of the blade to the tip. The spar interior surfaces include a leading edge surface that is composed of an upper leading edge portion and a lower leading edge portion. The spar interior surfaces further include a trailing edge surface that is composed of an upper trailing edge portion and a lower trailing edge portion. The spar interior surfaces also include an upper surface that extends between the leading edge upper portion and the trailing edge upper portion, as well as a lower surface that extends between the leading edge lower portion and the trailing edge lower portion.

The mandrel is made up of a forward component that includes an exterior surface that is shaped to provide the leading edge surface of the spar interior surface. The forward component includes an upper rear edge that has an outer surface, which is shaped to provide the upper leading edge portion of the spar interior surfaces. The forward component also includes a lower rear edge that is shaped to provide the lower leading edge portion of the spar interior surfaces. The mandrel also includes a rearward component that is shaped to provide the trailing edge surface of the spar interior surfaces. The rearward component includes an upper forward edge that is shaped to provide the upper trailing edge portion of the spar interior surfaces. The rearward component also includes a lower forward edge that is shaped to provide the lower trailing edge portion or the spar interior surfaces.

The forward and rearward components of the mandrel are connected together by an upper component and a lower component. The upper component is shaped to provide the upper surface of said spar interior surfaces. The upper component includes a forward edge that is connected to the upper rear edge of the forward component and a rearward edge that is connected to the upper forward edge of the rearward component. The lower component is shaped to provide the lower surface of said spar interior surfaces. The lower component includes a forward edge that is connected to the lower rear edge of the forward component and a rearward edge that is connected to the lower forward edge of said rearward component.

The final component of the mandrel is a support structure that is located between the upper component and the lower component. The support structure provides reinforcement for the upper and lower components and also holds them in place against the forward and rearward components. As a feature of the present invention, the support structure is collapsible when a tensioning force is applied to the support structure along the longitudinal axis of said rotor blade. The collapsing of the support structure allows it to be removed from the spar cavity. Once the support structure is removed, the upper and lower components of the mandrel can be disconnected from the forward and rearward components. The components can then be removed individually from the spar cavity.

The present invention also covers methods for making the multi-component mandrel as well as the methods for molding composite rotor blade spars using the multi-component mandrel and the resulting rotor blade spar. The multi-component mandrel of the present invention provides a number of advantages over existing methods for making composite rotor blades. These advantages include the ability to withstand the forces applied to the mandrel during fabrication of the composite blade in order to avoid any undesirable variations in blade shape. In addition, the mandrel can be used to form complex spar shapes including spars with varying degrees of twist and changes in elliptical cross-sectional geometry. A further advantage is that the mandrel can be re-assembled and used repeatedly.

The above described and many other features and attendant advantages of the present invention will become better understood by reference to the following detailed description when taken in conjunction with the accompanying drawings.

BRIEF DESCRIPTION OF THE DRAWINGS

FIG. 3 is a sectional of view of a portion of FIG. 2 taken in the 3-3 plane

FIG. 4 is the same view as FIG. 3 except that the composite material spar is shown in place on the exterior surface of the mandrel.

FIG. 5 is a cross-sectional view of the mandrel depicting how the components are separated for removal from the spar after compaction and/or curing of the composite spar.

DETAILED DESCRIPTION OF THE INVENTION

Figure 1:
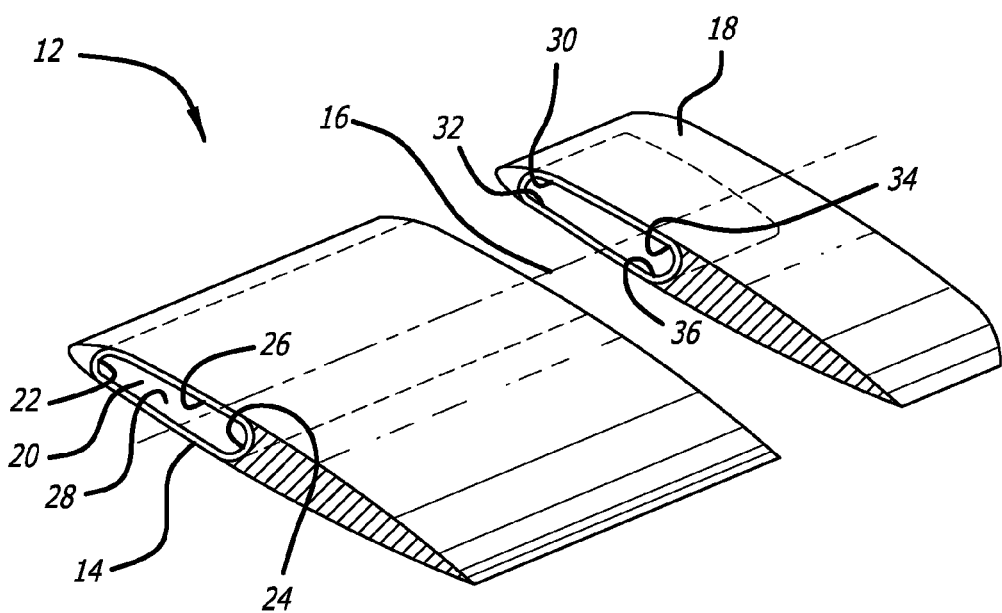
FIG. 1 is a partial perspective view of an exemplary composite helicopter rotor blade that includes a spar that can be made using the multi-component mandrel in accordance with the present invention.
Figure 2:
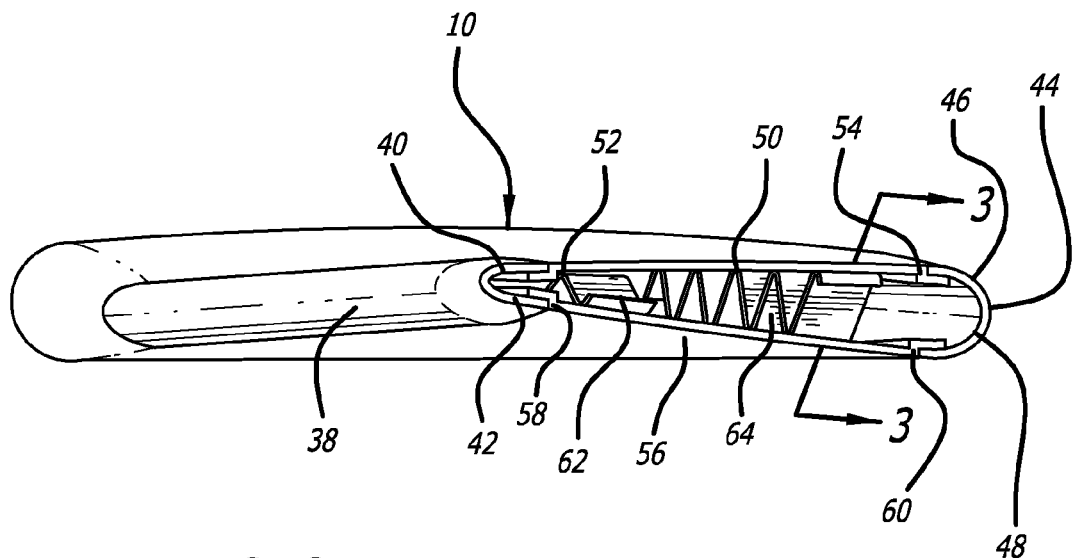
FIG. 2 is a perspective view of a preferred exemplary multi-component mandrel in accordance with the present invention.

A preferred exemplary multi-component mandrel in accordance with the present invention for use in molding a helicopter rotor blade from composite material is shown generally at 10 in FIG. 2. An exemplary helicopter rotor blade that can be molded utilizing the mandrel 10 is shown in a simplified form in FIG. 1 at 12. The rotor blade 12 includes a spar 14 that extends parallel to the longitudinal axis 16 of the rotor blade 12. The spar 14 typically extends from the root of the rotor blade (not shown) to the tip 18. The spar 14 is a tubular structure that has an elliptically shaped cross-section as shown in FIG. 1. The spar 14 includes a number of interior surfaces that are formed by the mandrel 10. These interior spar surfaces define the spar cavity 20.

Referring to FIG. 1, the spar interior surfaces are composed of a leading edge surface 22, trailing edge surface 24, an upper surface 26 and a lower surface 28. The leading edge surface 22 includes an upper leading edge portion 30 and a lower leading edge portion 32. The trailing edge surface 24 includes an upper trailing edge portion 34 and lower trailing edge portion 36. The upper surface 26 extends between the upper leading edge portion 30 and the upper trailing edge portion 34. The lower surface 28 extends between the lower leading edge portion 32 and the lower trailing edge portion 36.

Referring to FIG. 2, the mandrel 10 includes a forward component 38 that has an exterior surface, which is shaped to provide the spar interior leading edge surface 22. The mandrel forward component 38 includes an upper rear edge 40 that has an exterior surface, which is shaped to provide the upper leading edge portion 30 of the spar. The mandrel forward component 38 also includes a lower rear edge 42 that has an exterior surface, which is shaped to provide the lower leading edge portion 32 of the spar.

The mandrel 10 also includes a rearward component 44 that has an exterior surface, which is shaped to provide the spar interior trailing edge 24. The mandrel rearward component 44 includes an upper forward edge 46 that has an exterior surface, which is shaped to provide the upper trailing edge portion 34. The mandrel rearward component 44 also includes a lower forward edge 48 that has an exterior surface, which is shaped to provide the lower trailing edge portion 36.

The mandrel 10 further includes an upper component 50 that has an exterior surface, which is shaped to provide the spar upper interior surface 26. The upper component 50 includes a forward edge 52 that is connected to the upper rear edge 40 of the forward component 38. The upper component 50 also includes a rearward edge 54 that is connected to the upper forward edge 46 of the rearward component 44. The mandrel 10 also includes a lower component 56 that has an exterior surface, which is shaped to provide the spar lower interior surface 28. The lower component 56 includes a forward edge 58 that is connected to the lower rear edge 42 of the forward component 38. The lower component 56 also includes a rearward edge 60 that is connected to the lower forward edge 48 of the rearward component 44.

The final component of mandrel 10 is a collapsible support structure, which is shown in FIG. 2 as corrugated support strips 62 and 64. The corrugated support strips 62 and 64 extend longitudinally within the mandrel 10 (i.e. parallel to the longitudinal axis 16 of the spar). The corrugated support strips 62 and 64 are located within the mandrel cavity so as to provide an outward bias against the upper component 50 and lower component 56 and to provide support for these two components along their entire lengths. As can be seen from FIG. 2, the forward and rearward edges 52 and 54 of the upper component 50 are shaped so that they overlap on the inside of the upper rear edge 40 of the forward component 38 and upper forward edge 46 of the rearward component 44, respectively. This overlapping arrangement provides for a secure, but releasable, connection between the upper component 50 and the forward and rearward components 38 and 44. Likewise, the forward and rearward edges 58 and 60 of the lower component 56 are shaped so that they overlap on the inside of the lower rear edge 42 of the forward component 38 and lower forward edge 48 of the rearward component 44, respectively.

This overlapping arrangement also provides for a secure, but releasable, connection between the lower component 56 and the forward and rearward components 38 and 44.

The outward bias provided by the corrugated strips 62 and 64 against the upper and lower mandrel components 50 and 56 provides compression connections along the four locations where the mandrel components overlap as described above. These compression connections keep the mandrel in the form of a single relatively strong structure during fabrication of the composite spar. Upon removal of the corrugated support strips 62 and 64, the upper and lower components 50 and 56 may be move toward each other and disconnected from the forward and rearward components 38 and 44.

The collapsible support structure must be sufficiently strong to prevent the upper and lower components from collapsing together during lay up, compaction and curing of the composite spar. At the same time, the support structure must be able to collapse laterally when a tensioning force is applied to it along the longitudinal axis of the rotor blade. The term "collapsible" is used herein to mean that the structure must, as a minimum, be able to collapse a sufficient amount to reduce the friction between the support structure and the upper/lower components, so that the support structure may be pulled longitudinally from the root end of the spar cavity. In other words, the support structure must be able to collapse enough, when pulled from one end, to unlock the support structure from its friction fit against the upper and lower components.

Corrugated strips, as shown in FIG. 2 are the preferred collapsible support structure. However, other types of materials may be used provided that they meet the above criteria with respect to lateral shrinkage when a longitudinal tensioning force is applied. It should be noted that two corrugated strips 62 and 64 are shown in FIG. 2 as being preferred. However, a single corrugated strip may be used, especially in situations where the geometry of the spar cavity is not complex. Alternatively, more than two strips may be used, if desired.

The corrugated strips may be made from any material that provides the desired combination of strength and flexibility. It is preferred that the corrugated strips be sufficiently resilient that they are not deformed when they are collapsed and removed from the mandrel cavity by application of longitudinal tension. This allows the strips to used more than once as the collapsible support structure. A wide variety of metals are available that have the necessary strength and flexibility to function as a support structure. However, it is preferred that the corrugated strips be made from composite material. Composite materials provide the strength necessary to keep the upper and lower components from collapsing during application of external pressure during the compaction and curing processes. In addition, corrugated strips made from composite materials have sufficient flexibility and resiliency to collapse the desired amount when longitudinal tension is applied and then spring back to their original shape.

FIG. 3 is a sectional view that shows a portion of the corrugated strip 64 in place between the upper and lower components 50 and 56 of the mandrel 10. The corrugated strip 64 has ridges 66 which extend substantially perpendicular to the longitudinal axis 16 of the spar 14. Spacers 68 may be placed between the ridges 66 of the corrugated strip and the upper and lower components 50 and 56 to facilitate removal of the corrugated strip 64 from the mandrel. Use of spacers 68 to enhance release of the ridges 66 from the upper and lower components 50 and 56 is preferred, but not required. The spacers 68 may be used on all or some of the ridges 66. The spacers 68 may be in the form of single elongated strips or they may be in the form of multiple washers that are spaced along the ridges. The spacers 68 made from fiber reinforced polyamide or phenolic are preferred. However, the spacers can be made from a variety of materials provided that the surface tension is sufficiently low so that the washers are released from the mandrel surfaces when the corrugated strip is removed. Materials, such as polytetrafluoroethylene and other non-sticking substances, may be used, but are not particularly preferred because they can be difficult to keep in place on the ridges of the corrugated strips during mandrel assembly.

The washers are preferably kept in place on the ridges using a small amount of glue or other binder material that is sufficient to hold the washer in place during mandrel fabrication, but which allows the washers to be released from the ridges when the mandrel is removed from the spar cavity. In addition, it is preferred that the ridges be machined slightly in order to form platforms for seating the washer. The degree of machining depends upon the size of the washer and the thickness of the corrugated support material. The washers are typically on the order of a few thousandths of an inch thick to a few tenths of an inch thick or even thicker depending upon the particular mandrel dimensions and the degree to which the corrugated ridges are machined to accept the washer.

As shown in FIG. 3, it is preferred that the spacers 68 are located on only one side of the corrugated strip. The spacers 68 are shown located on the top ridges in FIG. 3 for demonstrative purposes only. The spacers 68 could alternatively be located on the bottom ridges. During assembly of the mandrel, it is preferred that the corrugated strip 64 be temporarily attached to the lower component 56 using removable fasteners. The removable fasteners, such as clecos, are used to connect the lower ridges of the corrugated strip to the lower component. The washers 68 are placed on the upper ridges of the corrugated strip 68 and then the upper component 50 is put in place. In order to hold the assembly of components together, it is preferred to wrap the completed assembly, as shown in FIG. 3, in shrink-wrap or other suitable tape.

FIG. 4 shows a partial cross-sectional view of the mandrel 10 located within the composite spar 14 just after compaction and/or curing of the composite material. Arrow 70 depicts the application of a tensioning force (i.e. pull) along the longitudinal axis of the rotor blade. Arrows 72 depict the collapsing of the corrugated strip 64 that results from the longitudinal pull on the strip. As is apparent, the ridges 66 only need to collapse in the direction of arrows 72 a sufficient amount to release washers 68, so that the strip 64 may be pulled longitudinally from the mandrel. This allows for the corrugated strip 64 to be deformed the minimum amount so that it can be reused a number of times. In some situations, especially with very complex spar geometries, it may be necessary to apply sufficient tension 70 in order to substantially collapse the corrugated strip in order to be able to remove it from the mandrel.

FIG. 5 is a simplified side cross-sectional view that shows the mandrel 10 in place after the corrugated supports strips 62 and 64 have been removed. The upper and lower components 50 and 56 are moved inward towards each other, as represented by arrows 74, so that they can be removed from the spar cavity 20. The forward and rearward components 38 and 44 are also moved inward towards each other, as represented by arrows 76, so that they also can be removed from the spar cavity 20.

The mandrel 10 may be removed from the spar cavity 20, as described above, either after compaction of the uncured spar composite material around the mandrel or after the compacted composite spar has been cured. It is preferred to remove the mandrel prior to curing in order to maximize the number of times it can be re-used. The mandrel should be able to withstand the pressures that are present during normal procedures for molding helicopter rotor blade spars. Typically, the mandrel should be able to withstand external pressures on the order of 10 to 15 inches of Hg and higher. The same mandrel should also be able to withstand the temperatures at which the composite materials used to make the spar are cured. Typically, such composites are cured at temperatures in the range of 120° C. to 200° C. and even higher.

The materials that are used to make the four external components of the mandrel 10 may also be any of the metals typically used for making mandrels for molding composite materials. However, as was the case with the corrugated support strips, composite materials are a preferred material for making the external mandrel components that actually come in contact with the spar during rotor blade fabrication. The external surfaces of the mandrel or the shrink-wrap (if used) may be coated with a suitable release agent, if desired.

The composite materials that may be used to make the mandrel components include those containing glass or carbon fibers. The fibers may be in the form of woven fabric, unidirectional fibers or randomly oriented fibers. Any of the various thermosetting resins that are suitable for use in relatively high temperature molding operations may be used as the matrix material. Exemplary resins include epoxies, phenolics, bismaleimides and polyester. A preferred material is an isotropic composite material that is composed of randomly oriented chips of unidirectional fibers in an epoxy matrix. This type of mandrel material is available from Hexcel Corporation (Dublin, Calif.) under the trade name HexMC®. An alternate preferred material for use in making the mandrel components is carbon fabric/epoxy prepreg, such as HEXCEL 8552, which is also available from Hexcel Corporation (Dublin, Calif.). Both of these materials are supplied as uncured prepregs, which can be formed into the desired mandrel component and cured according to conventional methods for fabricating and curing epoxy-based composite structures.

As an example, the mandrel of the present invention may be used to mold the spar of a helicopter rotor blade where the spar is on the order of 20 to 25 feet long or even longer for large helicopters. The distance between the leading edge and trailing edge of the spar at the blade root ranges from a few inches to two feet or more. This distance tapers down to a few inches to a foot or more at the blade tip. The thickness of the spar at the blade root ranges from an inch to a foot or more and tapers down to less than an inch or up to a few inches at the blade tip. The spar has a twist on the order 10 degrees about its longitudinal axis from the root of the spar to its tip. The various external components of the mandrel (forward component, rearward component, upper component and lower component) are made to match the internal shape of the spar. They are fabricated as four individual components that are each 20 to 25 feet long. Each component is made from a sufficient number of plies of Hexcel 8552 carbon/epoxy prepreg or HexMC® to make components that are from 0.01 inch thick to 0.5 inch thick or more depending upon the size of the mandrel. The components are cured according to conventional curing procedures.

For the exemplary mandrel described herein, two corrugated support strips are used that are both 20 to 25 feet long to match the length of the other mandrel components. The corrugated support strips are sized so that the lateral distances between the ridges match the thickness of the mandrel as it varies from root to tip and from leading edge to trailing edge. The two corrugated support strips are positioned inside the mandrel cavity so that they apply the proper outward bias force against the upper and lower components over the entire length of the mandrel. The longitudinal distance between the individual upper ridges on the corrugated strip should be sufficient to provide the needed support for the upper and lower components. The longitudinal distance between the lower ridges on the corrugated strip should be about the same as the distance between the upper ridges. The longitudinal distances between the ridges may vary form the root to the tip. For example, it may be desirable to make the ridges closer together nearer the root of the mandrel in order to provide added support where the spar cavity has the largest cross-sectional area.

The corrugated strips are also made from HEXCEL 8552 carbon/epoxy prepreg or HexMC®, which are also formed into the required corrugated shape and compacted and cured according to conventional curing procedures. The resulting corrugated strips should be sufficiently thick to provide support for the upper and lower components during compaction and curing, if desired. The composite corrugated strips should be made from a sufficient number of prepreg plies to provide corrugated strips that are strong enough to withstand the pressures to which the spar composite material and underlying mandrel are subjected to during standard compaction procedures and curing.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for molding a helicopter rotor blade wherein said rotor blade includes a spar that extends parallel to the longitudinal axis of said rotor blade, said longitudinal axis extending from the root of said rotor blade to the tip of said rotor blade, said spar having interior surfaces that defines a spar cavity that also extends longitudinally from the root of said rotor blade to the tip of said rotor blade, said spar interior surfaces including a leading edge surface that comprises an upper leading edge portion and a lower leading edge portion, a trailing edge surface that comprises an upper trailing edge portion and a lower trailing edge portion, an upper surface that extends between said leading edge upper portion and said trailing edge upper portion and a lower surface that extends between said leading edge lower portion and said trailing edge lower portion, said method comprising the steps of:

A) providing a mandrel that comprises:
   a forward component that comprises an exterior surface that is shaped to provide said leading edge surface of said spar interior surfaces, said forward component comprising an upper rear edge comprising an outer surface that is shaped to provide said upper leading edge portion and a lower rear edge that is shaped to provide said lower leading edge portion;
   a rearward component that is shaped to provide said trailing edge surface of said spar interior surfaces, said rearward component comprising an upper forward edge that is shaped to provide said upper trailing edge portion and a lower forward edge that is shaped to provide said lower trailing edge portion;
   an upper component that is shaped to provide said upper surface of said spar interior surfaces, said upper component comprising a forward edge that is connected to said upper rear edge of said forward component and a rearward edge that is connected to said upper forward edge of said rearward component;

a lower component that is shaped to provide said lower surface of said spar interior surfaces, said lower component comprising a forward edge that is connected to said lower rear edge of said forward component and a rearward edge that is connected to said lower forward edge of said rearward component; and a collapsible support structure located between said upper component and said lower component, said support structure being collapsible when a tensioning force is applied to said support structure along the longitudinal axis of said rotor blade, said collapsible support structure comprising corrugated material that comprises ridges which extend substantially perpendicular to said longitudinal axis wherein said ridges are friction fit against the upper and lower components;

B) applying uncured composite material to the exterior surface of said mandrel to form an uncured spar;

C) collapsing said collapsible support structure;

D) removing said mandrel from said spar cavity; and

E) curing said uncured spar.

2. A method for molding a helicopter rotor blade wherein said rotor blade includes a spar that extends parallel to the longitudinal axis of said rotor blade, said longitudinal axis extending from the root of said rotor blade to the tip of said rotor blade, said spar having interior surfaces that define a spar cavity that also extends longitudinally from the root of said rotor blade to the tip of said rotor blade, said spar interior surfaces including a leading edge surface that comprises an upper leading edge portion and a lower leading edge portion, a trailing edge surface that comprises an upper trailing edge portion and a lower trailing edge portion, an upper surface that extends between said leading edge upper portion and said trailing edge upper portion and a lower surface that extends between said leading edge lower portion and said trailing edge lower portion, said method comprising the steps of:

A) providing a mandrel that comprises:

a forward component that comprises an exterior surface that is shaped to provide said leading edge surface of said spar interior surfaces, said forward component comprising an upper rear edge comprising an outer surface that is shaped to provide said upper leading edge portion and a lower rear edge that is shaped to provide said lower leading edge portion;

a rearward component that is shaped to provide said trailing edge surface of said spar interior surfaces, said rearward component comprising an upper forward edge that is shaped to provide said upper trailing edge portion and a lower forward edge that is shaped to provide said lower trailing edge portion;

an upper component that is shaped to provide said upper surface of said spar interior surfaces, said upper component comprising a forward edge that is connected to said upper rear edge of said forward component and a rearward edge that is connected to said upper forward edge of said rearward component;

a lower component that is shaped to provide said lower surface of said spar interior surfaces, said lower component comprising a forward edge that is connected to said lower rear edge of said forward component and a rearward edge that is connected to said lower forward edge of said rearward component; and a collapsible support structure located between said upper component and said lower component, said support structure being collapsible when a tensioning force is applied to said support structure along the longitudinal axis of said rotor blade, said collapsible support structure comprising corrugated material that comprises ridges which extend substantially perpendicular to said longitudinal axis wherein said ridges are friction fit against the upper and lower components;

B) applying uncured composite material to the exterior surface of said mandrel to form an uncured spar;

C) curing said uncured spar;

D) collapsing said collapsible support structure; and

E) removing said mandrel from said spar cavity.

3. A method for molding a helicopter rotor blade according to claim 1 wherein said collapsible support structure comprises a forward piece of corrugated material and a rearward piece of corrugated material.

4. A method for molding a helicopter rotor blade according to claim 2 wherein said collapsible support structure comprises a forward piece of corrugated material and a rearward piece of corrugated material.

5. A method for molding a helicopter rotor blade according to claim 1 wherein said corrugated material comprises a resilient material.

6. A method for molding a helicopter rotor blade according to claim 2 wherein said corrugated material comprises a resilient material.

7. A method for molding a helicopter rotor blade according to claim 1 wherein said corrugated material comprises a forward edge and a rearward edge and wherein the lateral distance between the ridges of said corrugated material decreases from the forward edge of said corrugated material to the rearward edge of said corrugated material.

8. A method for molding a helicopter rotor blade according to claim 2 wherein said corrugated material comprises a forward edge and a rearward edge and wherein the lateral distance between the ridges of said corrugated material decreases from the forward edge of said corrugated material to the rearward edge of said corrugated material.

9. A method for molding a helicopter rotor blade according to claim 1 wherein the connections between said forward component and said upper and/or lower components are releasable connections.

10. A method for molding a helicopter rotor blade according to claim 2 wherein the connections between said forward component and said upper and/or lower components are releasable connections.

11. A method for molding a helicopter rotor blade according to claim 1 wherein the connections between said rearward component and said upper and/or lower components are releasable connections.

12. A method for molding a helicopter rotor blade according to claim 2 wherein the connections between said rearward component and said upper and/or lower components are releasable connections.

13. A method for molding a helicopter rotor blade according to claim 1 wherein the forward edge of said upper component overlaps the upper rearward edge of said forward component on the inside thereof and wherein the forward edge of said lower component overlaps the lower rearward edge of said forward component on the inside thereof.

14. A method for molding a helicopter rotor blade according to claim 2 wherein the forward edge of said upper component overlaps the upper rearward edge of said forward component on the inside thereof and wherein the forward edge of said lower component overlaps the lower rearward edge of said forward component on the inside thereof.

15. A method for molding a helicopter rotor blade according to claim 1 wherein the rearward edge of said upper component overlaps the upper forward edge of said rearward component on the inside thereof and wherein the rearward edge of said lower component overlaps the lower forward edge of said rearward component on the inside thereof.

16. A method for molding a helicopter rotor blade according to claim 2 wherein the rearward edge of said upper component overlaps the upper forward edge of said rearward component on the inside thereof and wherein the rearward edge of said lower component overlaps the lower forward edge of said rearward component on the inside thereof.

\* \* \* \* \*